Patented Jan. 21, 1930

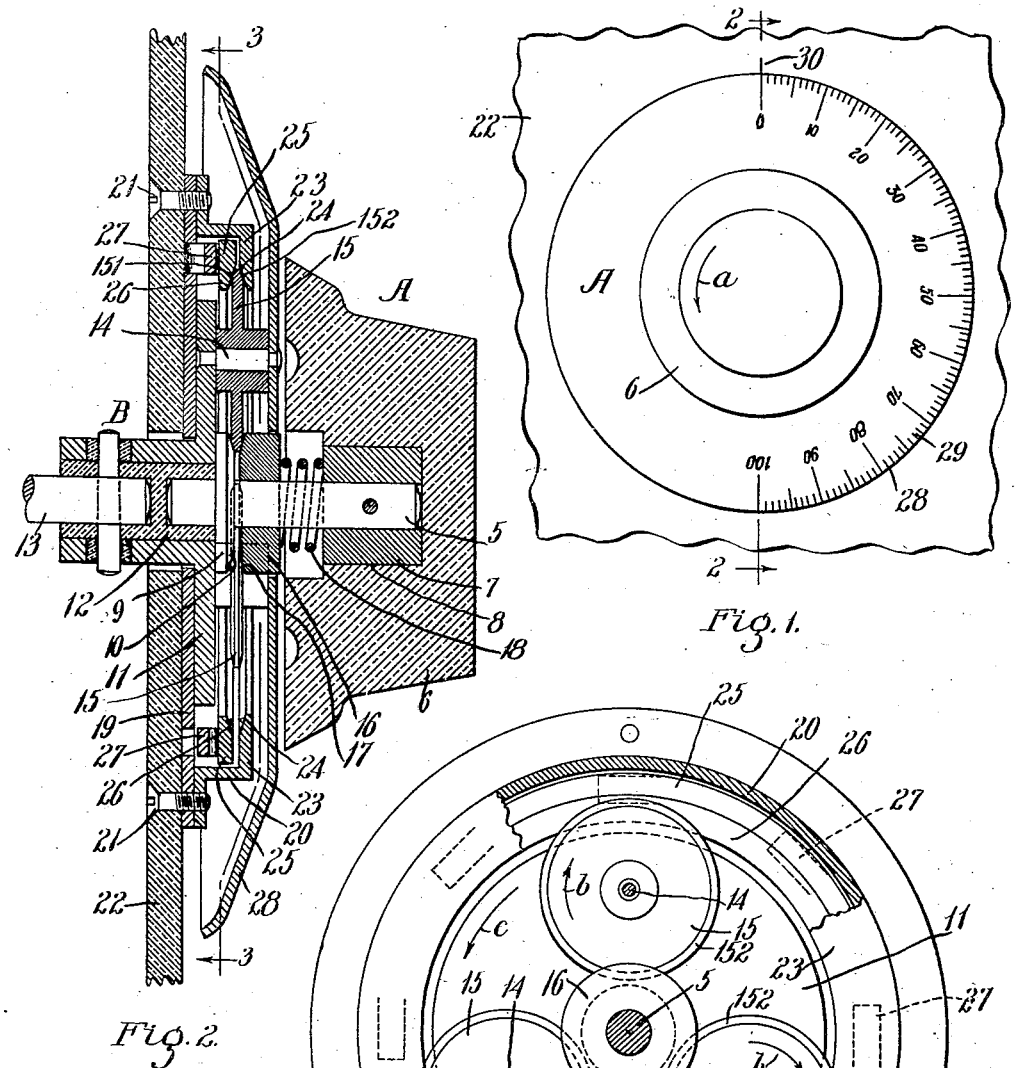

1,744,675

UNITED STATES PATENT OFFICE

WILLIAM A. READY, OF BROOKLINE, MASSACHUSETTS

FRICTION TRANSMISSION MECHANISM

Application filed October 26, 1922. Serial No. 597,014.

This invention relates to a friction transmission mechanism particularly adapted for use in connection with rotating the movable part of a radio or like instrument and has for its object to provide a friction mechanism embodying the principle of the well known planetary gearing but in a manner to eliminate the customary back-lash which is present where gears are employed, and to permit the contacting surfaces to slip one upon the other if for any reason the driven member is obstructed.

Another object of the invention is to construct a device through the medium of which a member which normally constitutes the driven member is rotated at a much slower speed than the driving member, the construction being such, however, that if it is so desired, the operation of the mechanism may be reversed and the member which normally performs the functions of a driving member will constitute the driven member, in which event the latter is rotated at a much faster speed than its driving member.

The invention consists in the combination and arrangement of parts set forth in the following specification and particularly pointed out in the claims thereof.

Referring to the drawings:

Figure 1 represents a front elevation of a portion of the mechanism embodying the invention.

Fig. 2 represents a central, vertical section taken on the line 2—2 of Fig. 1, the same being illustrated upon an enlarged scale.

Fig. 3 is a transverse section taken on the line 3—3 of Fig. 2.

Like numerals refer to like parts throughout the several views of the drawings.

In the drawings, A represents a rotatable driving member embodying therein a driving shaft 5 at one end of which a handle 6 is rigidly fastened in any desirable manner. The handle 6 is preferably constructed of suitable insulating material and has a metal bushing 7 located within a recess 8 formed therein, said bushing being mounted upon said shaft. The shaft 5 has a flange 9 formed integral therewith which is provided with a bevelled end surface 10 extending therearound.

Rotatably mounted upon the opposite end portion of the shaft 5 from that at which the handle 6 is located is a driven member B embodying therein a flanged member 11, the bore of which is lined with insulating material 12. A shaft 13 constituting a driven shaft is secured in any suitable manner within the member 11 and is entirely insulated therefrom and from the driving shaft 5 by the insulating material 12. The longitudinal median lines of the driving shaft 5 and driven shaft 13 are coincident.

A plurality of studs 14 preferably three in number, are rigidly secured in the member 11, preferably by being riveted at one end thereof to said member and rotatably mounted upon each stud 14 is a friction wheel 15 provided with oppositely disposed bevelled end surfaces 151 and 152, the former overlapping and contacting with the bevelled end surface 10 of the flange 9. A friction collar 16 is slidably mounted upon the driving shaft 5 and is provided with a bevelled surface 17 extending therearound which contacts with the bevelled surfaces 152 of the discs of wheels 15. A spring 18 surrounds the shaft 5 and acts to always force the collar 16 into contact with the friction wheels 15, said collar contacting with equal pressure with each of said wheels, the end surfaces 151 and 152 of the latter contacting with the bevelled end surfaces 10 and 17 of the flange 9 and collar 16 respectively.

Located adjacent to the driven member B, a portion of which projects therethrough, is a plate 19 to which a stationary friction member 20 is secured in any desirable manner. The plate 19 and stationary friction member 20 are secured simultaneously by screws 21 to a frame 22 of any suitable character but preferably constructed of insulating material, and said frame constitutes a support for the entire mechanism. The stationary friction member 20 has an annular flange 23 formed integral therewith which is provided with a bevelled surface 24 extending therearound against which the friction wheels 15 contact. A floating friction ring 25 is loosely mounted within the friction member 20, being located upon the opposite side of the friction wheels 15 from the flange 23 and is provided with a bevelled surface 26 extending therearound which contacts with the bevelled surfaces 151 of the friction wheels 15. A plurality of inwardly projecting lips 27 formed integral with the plate 19 and constituting springs contact with the ring 25 and act to always force the latter against the friction wheels 15 and the opposite corners of the latter are gripped between the bevelled surfaces 24 and 26 of the flange 23 and ring 25 respectively. A dial 28 provided with suitable graduations 29 is riveted to the studs 14 and is, therefore, rotatable in unison with the driven member B. The dial 28 indicates the position of the driven member and is formed in such a manner that it encloses the mechanism exclusive of the handle 6 at the front thereof and therefore also constitutes a shield for the rotating and revolving parts of the mechanism. A mark 30 provided upon the frame 22 is utilized in conjunction with the graduations 29 to indicate the movement of the dial 28.

The general operation of the mechanism which, in its present embodiment is adapted to be connected through the medium of the shaft 13 to a radio condenser or other rotary adjustable circuit tuning device in order to adjust the rotor thereof relatively to the stator and between which it is desirable to obtain a very fine adjustment, is as follows:—
The handle 6 when rotated in the direction of the arrow $a$ in Fig. 1 causes each of the friction wheels 15 to be rotated in the direction of the arrows $b$ in Fig. 3 by being gripped between the bevelled surfaces 10 and 17 of the flange 9 and collar 16 respectively but owing to the fact that said wheels 15 are also gripped between the bevelled surfaces 24 and 26 of the stationary friction member 23 and ring 25 respectively, the member 11 by which the wheels are carried is rotated in the direction of the arrow $c$, Fig. 3 and at a greatly reduced rate of speed as compared to the speed of the handle 6. The driven shaft 13 fast in the member 11 and the dial 28 also fast to said member all travel at the same rate of speed as the member 11 and in the same direction. In the mechanism illustrated, the various parts are so proportioned that the ratio of speed of the handle 6 as compared to the speed of the driven shaft 13 is as five to one and a very slight movement may therefore be given to the shaft 13 if the handle 6 is turned slowly.

It is evident that if it is so desired, the operation of the mechanism may be reversed without departing from the spirit of the invention, in which event the shaft 13 which normally constitutes the driven shaft, will constitute the driving shaft and the shaft 5 will constitute the driven shaft. At such times the ratio of speed of the driving shaft as compared to the speed of the driven shaft will be as one to five. In instances where it is not necessary to employ a dial to indicate the position of the driven member, the graduations 29 may be omitted and the member 28 minus said graduations may still be utilized to constitute a shield to protect the moving parts of the mechanism, or, said member 28 may be omitted and the mechanism enclosed in a suitable stationary shield.

While I have illustrated and described a preferred embodiment of my invention, I do not wish to be limited thereby and reference is made to the following claims to indicate the scope of my invention.

I claim:

1. A transmission mechanism comprising, in combination, a driving member, a driven member, friction wheels rotatably mounted upon one of said members and having frictional engagement with the other of said members, a dial fast to one of said members, a stationary friction member and floating yielding means to hold said wheels in frictional engagement with said stationary friction member and co-operating with the latter to pinch said wheels therebetween.

2. A transmission mechanism comprising, in combination, a driving member, a driven member, friction wheels rotatably mounted upon one of said members and having frictional engagement with the other of said members, a stationary annular friction member engaging said friction wheels upon one side thereof and a floating ring yieldingly engaging said friction wheels upon the other side thereof.

3. A transmission mechanism comprising, in combination, a driving member, a driven member, friction wheels rotatably mounted upon one of said members and having frictional engagement with the other of said members, a stationary annular friction member engaging said friction wheels upon one side thereof, a floating ring yieldingly engaging said friction wheels upon the other side thereof and a friction collar also yieldingly engaging said friction wheels.

4. A transmission mechanism comprising, in combination, a driving member, a driven member, friction wheels rotatably mounted upon one of said members and having frictional engagement with the other of said members, a dial fast to one of said members and rotatable in unison therewith, a stationary annular friction member engaging said friction wheels upon one side thereof, a floating ring yieldingly engaging said friction wheels upon the other side thereof and a friction collar also yieldingly engaging said friction wheels.

5. A transmission mechanism comprising, in combination, a driving member, a driven member, friction wheels rotatably mounted upon said driven member and having frictional engagement with said driving member, a stationary annular friction member engaging said friction wheels upon one side thereof, a floating ring yieldingly engaging said friction wheels upon the other side thereof and a friction collar mounted upon said driving member and yieldingly engaging said friction wheels.

6. A transmission mechanism comprising, in combination, a driving shaft, a handle of insulating material fast to said shaft, a member rotatably mounted upon said driving shaft, a shaft mounted in said member and insulated therefrom, friction wheels rotatably mounted upon said member and having frictional engagement with said driving shaft, a dial fast to said member and rotatable in unison therewith, a stationary annular friction member engaging said friction wheels upon one side thereof, a ring yieldingly engaging said friction wheels upon the other side thereof, a friction collar mounted upon said driving shaft and means to force said collar into engagement with said friction wheels.

7. A transmission mechanism comprising, in combination, a driving shaft provided with a bevelled surface thereon, a handle fast to said shaft, a rotatable driven member, frictional wheels rotatably mounted upon said driven member and provided with bevelled surfaces thereon, one of said surfaces having frictional engagement with the bevelled surface of said driving shaft, a dial fast to said driven member and rotatable in unison therewith, a stationary annular friction member provided with a bevelled surface thereon having frictional engagement with the bevelled surface of said friction wheels upon one side thereof, a ring provided with a bevelled surface and yieldingly engaging the bevelled surface of said friction wheels upon the other side thereof, a friction collar mounted upon said driving shaft and provided with a bevelled surface thereon and means to force said collar into engagement with said friction wheels, the bevelled surface of the former contacting with a bevelled surface of the latter.

8. A variable indicating mechanism for securing and indicating the fine adjustment of a radio instrument located behind the panel of a radio set, said indicating mechanism including a hub for detachable engagement with a shaft of the instrument to be adjusted, an inscribed dial exposed at the front of the panel and operatively connected with said hub to indicate the degree of rotation thereof, a hand operated driving member comprising a knob located in front of the panel, a shaft extending from said knob and friction operated means connected between the hub and hand operated shaft whereby when said knob is rotated said friction means will transmit motion to the hub and inscribed dial, said friction operating means including a relatively thin disc and a pair of other relatively thin discs arranged side by side and pressed against opposite faces of the first mentioned disc thereby providing for substantal frictional engagement between the discs to eliminate slippage and back lash during their driving operation.

In testimony whereof I have hereunto set my hand.

WILLIAM A. READY.